US007344794B2

(12) United States Patent
Tanaka et al.

(10) Patent No.: US 7,344,794 B2

(45) Date of Patent: Mar. 18, 2008

(54) FUEL CELL WITH DEFORMABLE SEAL MEMBERS

(75) Inventors: Hiroyuki Tanaka, Utsunomiya (JP); Narutoshi Sugita, Utsunomiya (JP); Tadashi Nishiyama, Tochigi-ken (JP); Takaki Nakagawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 573 days.

(21) Appl. No.: 10/884,402

(22) Filed: Jul. 1, 2004

(65) Prior Publication Data

US 2005/0031934 A1 Feb. 10, 2005

(30) Foreign Application Priority Data

Jul. 2, 2003 (JP) ............................ 2003-270312

(51) Int. Cl.
*H01M 2/02* (2006.01)

(52) U.S. Cl. ............................ 429/34; 429/35; 429/38

(58) Field of Classification Search .................. 429/35, 429/37, 38, 34, 32, 26

See application file for complete search history.

(56) References Cited

U.S. PATENT DOCUMENTS 6,692,860 B2 2/2004 Inoue et al.

FOREIGN PATENT DOCUMENTS

EP 1152477 * 11/2001
JP 2002-25587 1/2002

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A seal member is formed integrally on surfaces of a metal separator of a fuel cell. The seal members include an outer seal provided near the outer edge of the separator, and an inner seal spaced inwardly from the outer seal by a predetermined distance. When a load is applied to the outer seal and the inner seal in a stacking direction, the outer seal and the inner seal are deformed substantially equally in the stacking direction to the same extent.

4 Claims, 9 Drawing Sheets

12(10)
OXYGEN-CONTAINING GAS
COOLANT
FUEL GAS 18
50
30b (O2)
32a
34a (H2)
(COOLANT)
52
C
18a (b)
OXYGEN-CONTAINING GAS
B
42
54
16
34b (H2)
32b
30a (O2)
(COOLANT)

20
56
86
34b
(H2)
94a
32b
(COOLANT)
30a
(O2)
68
64
60
98
94b
58b (d)
58a (c)
20a (b)
16
FUEL GAS
C
B
44
62
66
70
30b
(O2)
32a
(COOLANT)
92a
92b
34a
(H2)
84
96

20
56
20b (a)
58c (a)
58d (b)
86
98
34b (H2)
90
94a
94b
66
70
30b (O2)
80b
80a
74
32b
(COOLANT)
78
82a
82b
76
32a
(COOLANT)
72
92b
88
92a
30a (O2)
68
64
34a (H2)
96
84
46
C
B
COOLANT

FUEL CELL WITH DEFORMABLE SEAL MEMBERS

BACKGROUND OF THE INVENTION

1. Field of the Invention

The present invention relates to a fuel cell formed by stacking a plurality of power generation cells. Each of the power generation cells includes an electrolyte electrode assembly and first and second separators sandwiching the membrane electrode assembly. The electrolyte electrode assembly includes a first electrode and a second electrode, and an electrolyte membrane interposed between the electrodes. The surface area of the second electrode is larger than the surface area of the first electrode.

2. Description of the Related Art

For example, a solid polymer fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly and separators sandwiching the membrane electrode assembly make up a unit of a power generation cell for generating electricity. A predetermined number of the power generation cells are stacked together to form a stack of the fuel cell.

In the power generation cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

Various sealing structures are used for preventing the leakage of the fuel gas and the oxygen-containing gas in the power generation cell. For example, Japanese laid-open patent publication 2002-25587 discloses a fuel cell which is designed to improve sealing characteristics between a membrane electrode assembly and separators. As shown in FIG. 9, the fuel cell includes a power generation cell formed by a membrane electrode assembly 1*a* interposed between first and second separators 2*a*, 3*a*. The membrane electrode assembly 1*a* includes an anode 5*a*, a cathode 6*a*, and a solid polymer electrolyte membrane 4*a* interposed between the anode 5*a* and the cathode 6*a*. The surface area of the anode 5*a* is larger than the surface area of the cathode 6*a*.

A first seal 8*a* is attached to an inner surface of a second separator 3*a*. The first seal 8*a* is provided around the cathode 6*a*, and tightly in contact with the solid polymer electrolyte membrane 4*a*. Further, a second seal 8*b* is provided between the first and second separators 2*a*, 3*a* around the first seal 8*a*.

The first and second seals 8*a*, 8*b* prevent the leakage of the reactant gases and the coolant. Further, the load balance in the surface of the power generation cell should be uniform, and the pressure load balance should not change depending on the power generation cell in order to achieve the uniform, and the stable power generation performance in each of the power generation cells. In particular, the pressure applied to the power generation surface should be kept at the desired level to stabilize the power generation performance. Further, each of the power generation cells should have a uniform space in the flow field so that the cross sectional area of the flow field does not change depending on the power generation cell, and the uniform flow rates of the reactant gases distributed from the reactant gas passages and the coolant distributed from the coolant passage can be achieved.

When thin metal separators are used as the first and second separators 2*a*, 3*a*, the balance of the line pressure (load) is not uniform, and the separators 2*a*, 3*a* tend to be deformed in the stacking direction. Thus, the pressure is applied to the sealing surface or the power generation surface excessively or insufficiently. As a result, it is difficult to achieve the desired power generation performance with the simple structure.

In the membrane electrode assembly 1*a*, the surface area of the anode 5*a* is larger than the surface area of the cathode 6*a*. In the structure, it is likely that the membrane electrode assembly 1*a* is deformed easily due to the difference between the surface pressure applied to the seal of the first separator 2*a* and the surface pressure applied to the seal of the second separator 3*a*.

SUMMARY OF THE INVENTION

A general object of the present invention is to provide a fuel cell having a simple structure in which deformation of a separator and a membrane electrode assembly is reliably prevented, and the desired sealing performance and the desired power generation performance are achieved.

According to the present invention, a fuel cell is formed by stacking a plurality of power generation cells in a stacking direction. Each of the power generation cells includes a membrane electrode assembly, and first and second separators sandwiching the membrane electrode assembly. The membrane electrode assembly includes a first electrode and a second electrode, and an electrolyte membrane interposed between the first electrode and the second electrode. The surface area of the second electrode is larger than the surface area of the first electrode. Reactant gas flow fields are formed between the membrane electrode assembly and the first and second separators for supplying reactant gases along electrode surfaces of the first and second electrodes.

First and second seal members are provided on the first and second separators. An inner seal and an outer seal are provided on one surface of the second seal member facing the first electrode. The inner seal is interposed between the electrolyte membrane and the second separator, and the outer seal is interposed between the first and second separators.

When a load is applied to the inner seal and the outer seal in the stacking direction, the inner seal and the outer seal are deformed substantially equally in the stacking direction to the same extent. Therefore, on one surface of the second separator, line pressures of the inner seal and the outer seal are substantially the same, and the second separator is not deformed. Thus, it is possible to effectively prevent deformation of the membrane electrode assembly.

The deformation in the stacking direction is prevented in each of the power generation cells. The load is distributed uniformly in the entire surfaces of the power generation cells. Therefore, the power generation performance can be maintained stably. It is possible to maintain the flow rates of the reactant gas and the coolant stably. The uniform power generation performance can be stably maintained in each of the power generation cells.

With the simple structure, the space in the power generation cell is provided uniformly, and the space between the power generation cells is provided uniformly. The reactant gas and the coolant flow through connection channels smoothly, and the desired sealing performance in the power generation cell is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
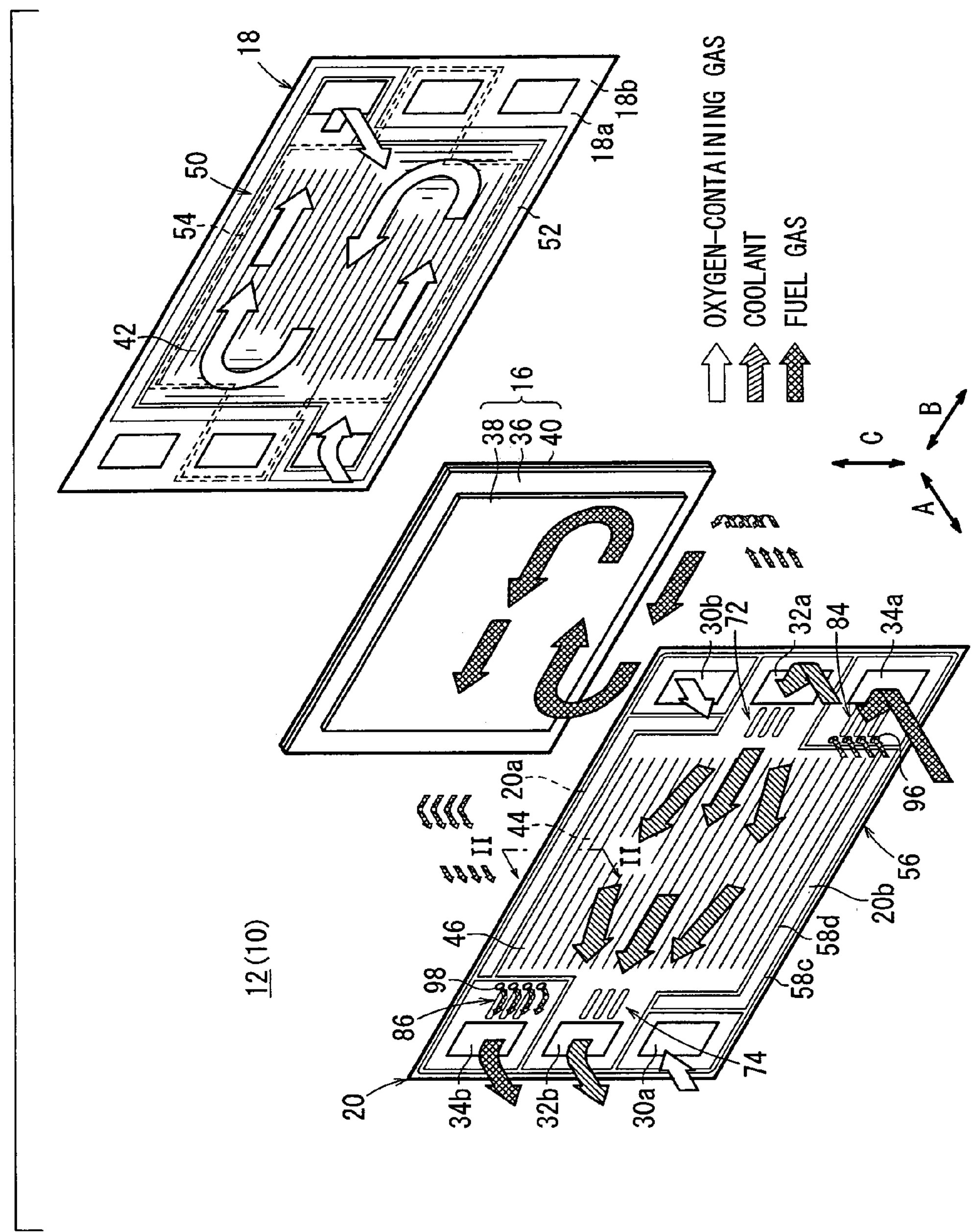
FIG. 1 is an exploded perspective view showing main components of a power generation cell of a fuel cell according to an embodiment of the present invention.
Figure 2:
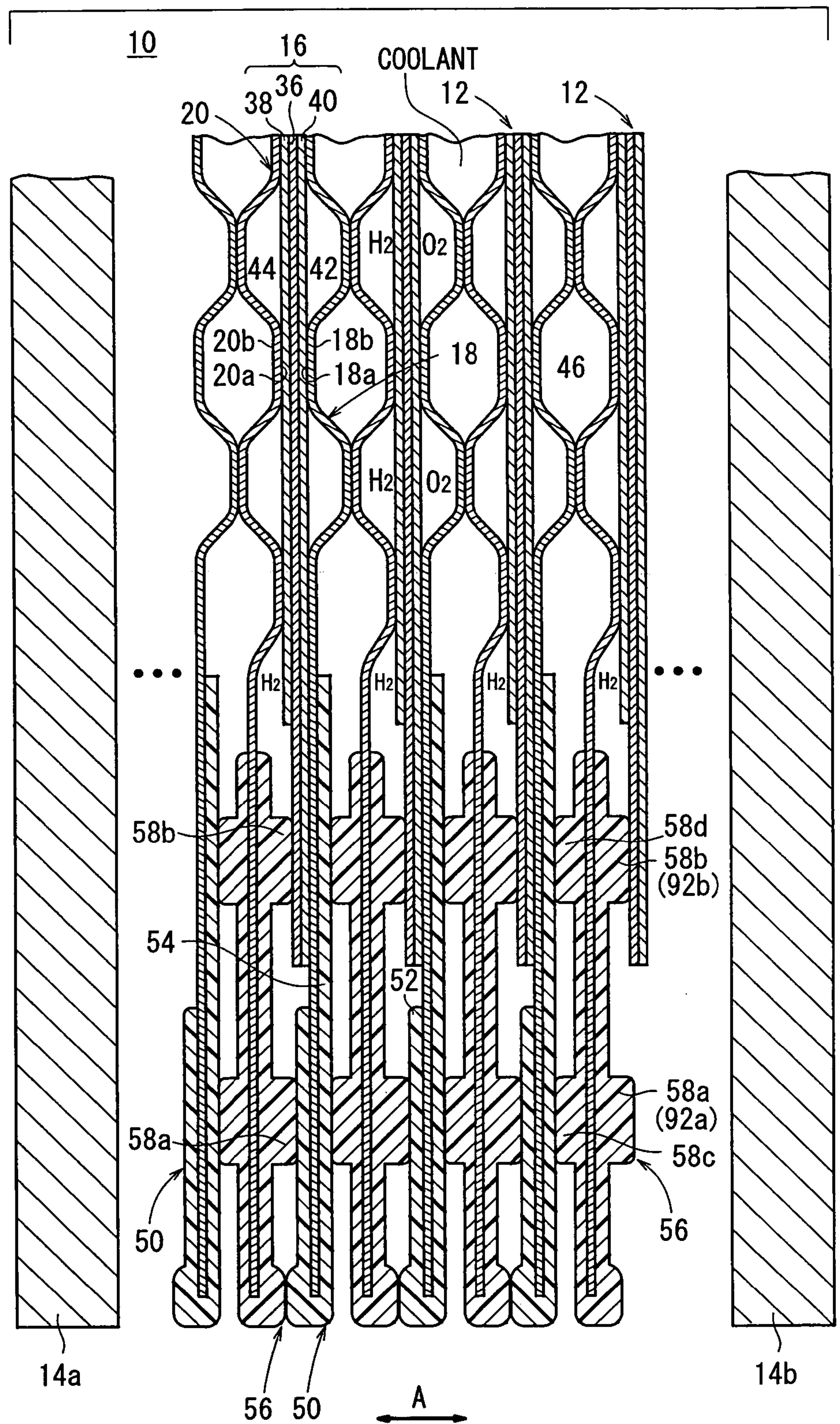
FIG. 2 is a cross sectional view showing the fuel cell, taken along a line II-II shown in FIG. 1.

FIG. 1 is an exploded perspective view showing main components of a power generation cell 12 of a fuel cell 10 according to an embodiment of the present invention. FIG. 2 is a cross sectional view taken along a line II-II shown in FIG. 1, showing the fuel cell 10 formed by stacking a plurality of power generation cells 12 in a direction indicated by an arrow A.

Figure 3:
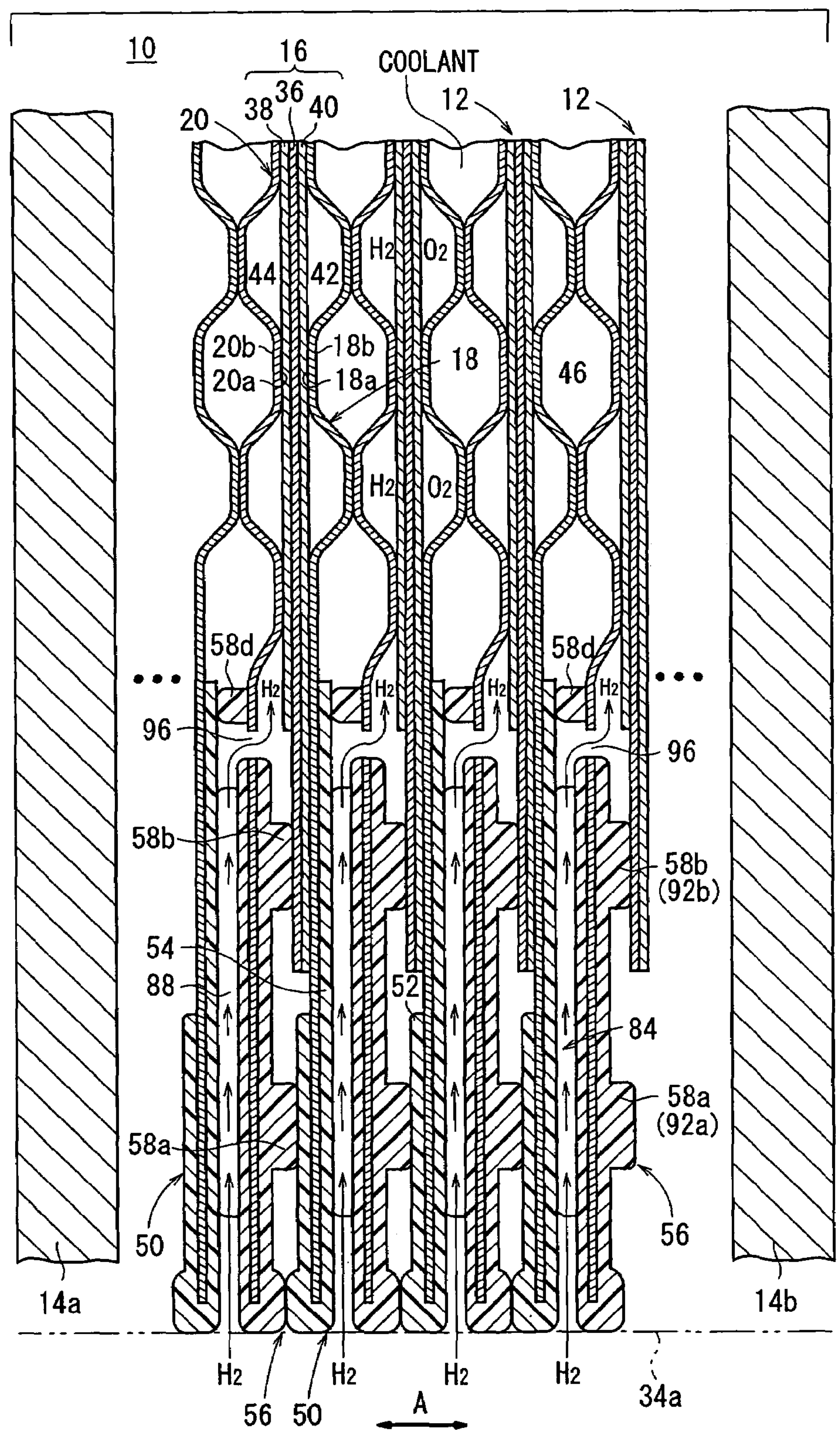
FIG. 3 is a partial cross sectional view taken along a line passing through a fuel gas supply passage of the fuel cell.
Figure 4:
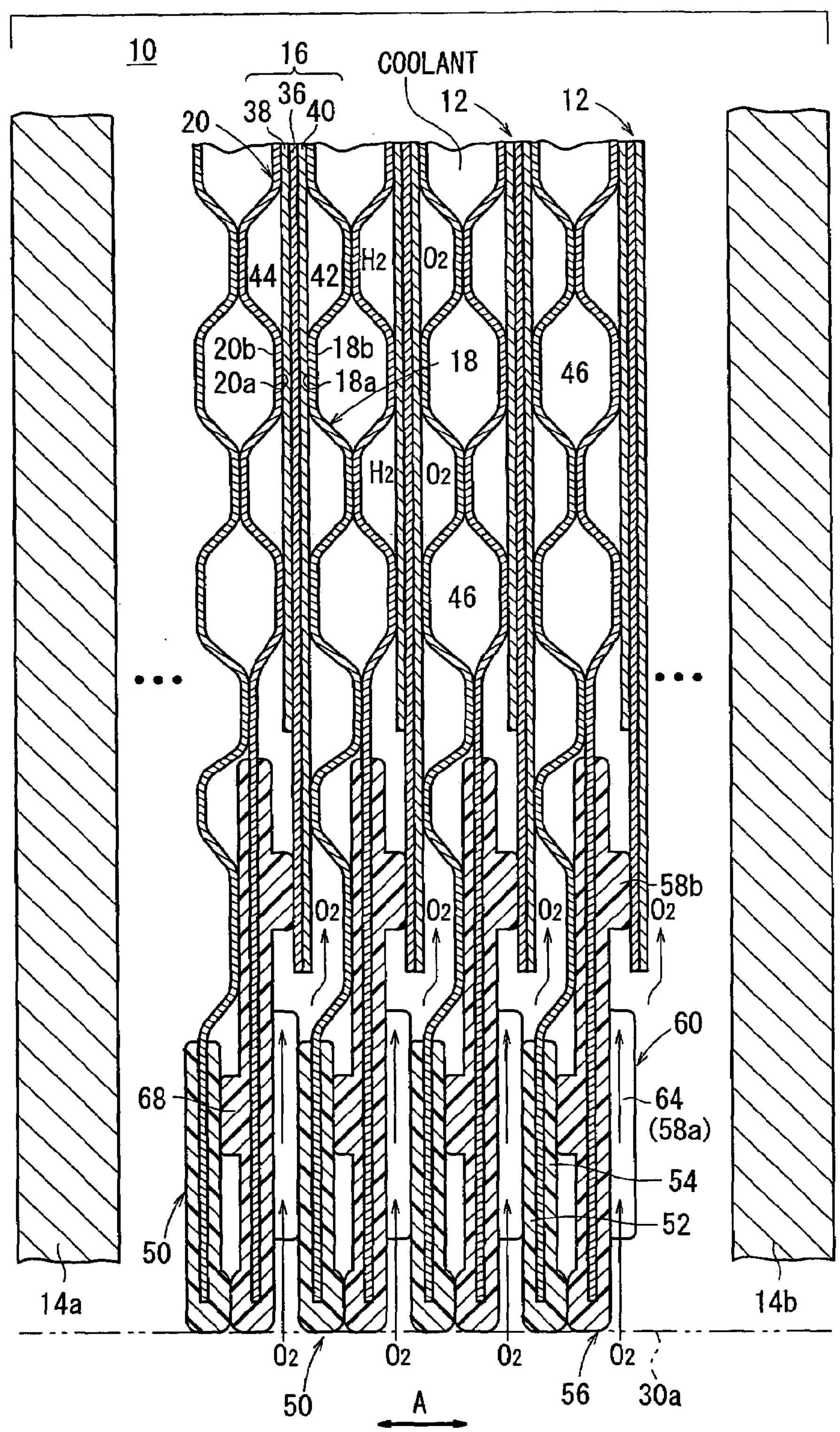
FIG. 4 is a partial cross sectional view taken along a line passing through an oxygen-containing gas supply passage of the fuel cell.

As shown in FIGS. 2 to 4, the fuel cell 10 is formed by stacking the power generation cells 12 in the direction indicated by the arrow A. At opposite ends of the fuel cell 10 in the stacking direction, end plates 14*a*, 14*b* are provided. The end plates 14*a*, 14*b* are fixed to the fuel cell 10 by tie rods (not shown) for tightening the power generation cells 12 with a predetermined tightening force in the direction indicated by the arrow A.

As shown in FIG. 1, the power generation cell 12 includes a membrane electrode assembly 16 and first and second metal separators 18, 20 sandwiching the membrane electrode assembly 16. For example, the first and second metal separators 18, 20 are steel plates, stainless steel plates, aluminum plates, plated steel sheets, or metal plates having anti-corrosive surfaces by surface treatment. The first and second metal separators 18, 20 have a thickness ranging from, e.g., 0.05 mm to 1.0 mm.

As shown in FIG. 1, at one horizontal end of the power generation cell 12 in a direction indicated by an arrow B, an oxygen-containing gas supply passage 30*a* for supplying an oxygen-containing gas, a coolant discharge passage 32*b* for discharging a coolant, and a fuel gas discharge passage 34*b* for discharging a fuel gas such as a hydrogen-containing gas are arranged vertically in a direction indicated by an arrow C. The oxygen-containing gas supply passage 30*a*, the coolant discharge passage 32*b*, and the fuel gas discharge passage 34*b* extend through the power generation cell 12 in the stacking direction indicated by the arrow A.

At the other horizontal end of the power generation cell 12 in the direction indicated by the arrow B, a fuel gas supply passage 34*a* for supplying the fuel gas, a coolant supply passage 32*a* for supplying the coolant, and an oxygen-containing gas discharge passage 30*b* for discharging the oxygen-containing gas are arranged vertically in the direction indicated by the arrow C. The fuel gas supply passage 34*a*, the coolant supply passage 32*a*, and the oxygen-containing gas discharge passage 30*b* extend through the power generation cell 12 in the direction indicated by the arrow A.

The membrane electrode assembly 16 comprises an anode (first electrode) 38, a cathode (second electrode) 40, and a solid polymer electrolyte membrane 36 interposed between the anode 38 and the cathode 40. The solid polymer electrolyte membrane 36 is formed by impregnating a thin membrane of perfluorosulfonic acid with water, for example. The surface area of the anode 38 is smaller than the surface area of the cathode 40.

Each of the anode 38 and the cathode 40 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first metal separator (first separator) 18 has an oxygen-containing gas flow field (reactant gas flow field) 42 on its surface 18*a* facing the membrane electrode assembly 16. The oxygen-containing gas flow field 42 includes a plurality of grooves extending in a serpentine pattern such that the oxygen-containing gas flows in the direction indicated by the arrow B, and turns upwardly, for example (see FIGS. 1 and 5). The oxygen-containing gas flow field 42 is connected to the oxygen-containing gas supply passage 30*a* at one end, and connected to the oxygen-containing gas discharge passage 30*b* at the other end. As shown in FIG. 6, the second metal separator (second separator) 20 has a fuel gas flow field (reactant gas flow field) 44 on its surface 20*a* facing the membrane electrode assembly 16. The fuel gas flow field 44 includes a plurality of grooves extending in a serpentine pattern such that the fuel gas flows in the direction indicated by the arrow B, and turns upwardly indicated by the arrow C. The fuel gas flow field 44 is connected to the fuel gas supply passage 34*a* at one end, and connected to the fuel gas discharge passage 34*b* at the other end.

As shown in FIGS. 1 and 2, a coolant flow field 46 is formed between a surface 18*b* of the first metal separator 18 and a surface 20*b* of the second metal separator 20. The coolant flow field 46 includes a plurality of grooves extending straight in the direction indicated by the arrow B. The coolant flow field 46 is connected to the coolant supply passage 32*a* at one end, and connected to the coolant discharge passage 32*b* at the other end.

Figure 5:
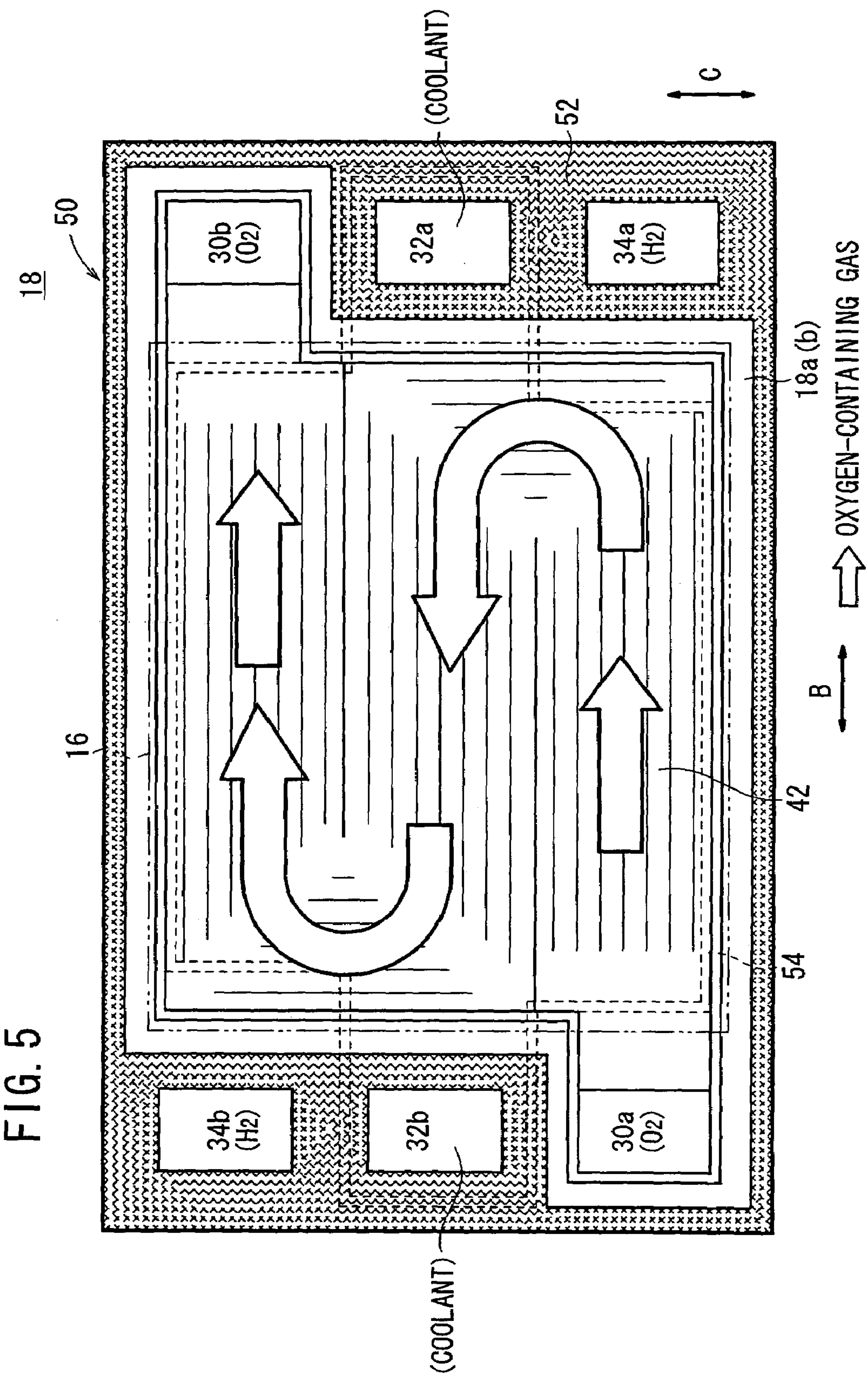
FIG. 5 is a front view showing a first metal separator of the power generation cell.
Figure 6:
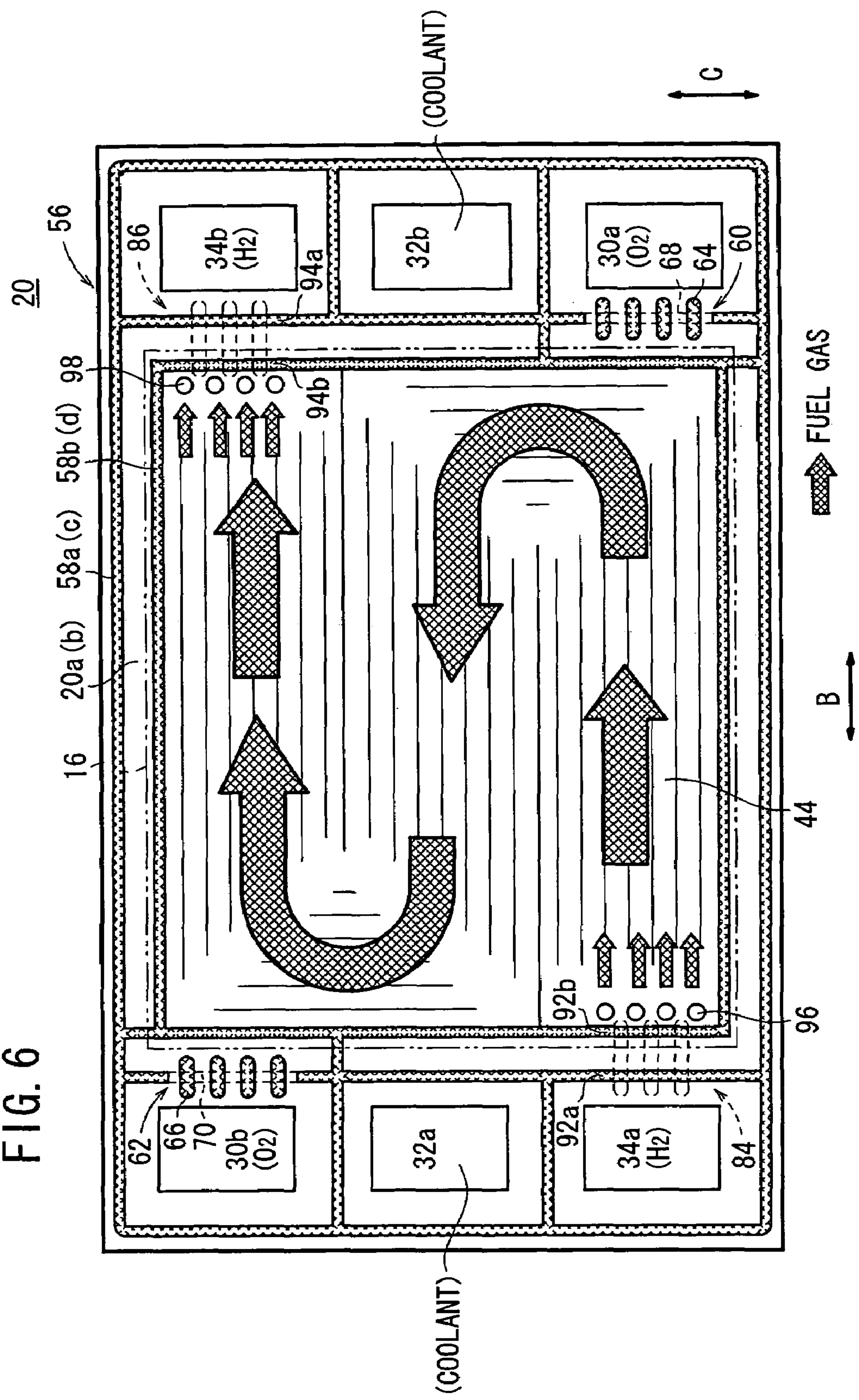
FIG. 6 is a front view showing one surface of a second metal separator of the power generation cell.

As shown in FIGS. 1 and 5, a first seal member 50 is formed integrally on the surfaces 18*a*, 18*b* of the first metal separator 18 to cover (sandwich) the outer edge of the first metal separator 18. The first seal member 50 is made of seal material, cushion material or packing material such as EPDM (Ethylene Propylene Diene Monomer), NBR (Nitrile Butadiene Rubber), fluoro rubber, silicon rubber, fluoro silicon rubber, butyl rubber (Isobutene-Isoprene Rubber), natural rubber, styrene rubber, chloroprene rubber, or acrylic rubber.

The first seal member 50 includes a first planar section 52 on the surface 18*a* of the first metal separator 18, and a second planar section 54 on the surface 18*b* of the first metal separator 18. The second planar section 54 is larger than the first planar section 52.

As shown in FIGS. 2 and 3, the first planar section 52 is provided around the membrane electrode assembly 16 such that the first planar section 52 is spaced outwardly from an outer edge of the membrane electrode assembly 16. The second planar section 54 is provided around the membrane electrode assembly 16 such that the second planar section 54 partially overlaps the cathode 40. As shown in FIG. 5, the first planar section 52 is not provided between the oxygen-containing gas supply passage 30*a* and the oxygen-containing gas flow field 42, and between the oxygen-containing gas discharge passage 30*b* and the oxygen-containing gas flow field 42. Thus, the oxygen-containing gas supply passage 30*a* and the oxygen-containing gas discharge passage 30*b* are connected to the oxygen-containing gas flow field 42. Further, the second planar section 54 is provided such that the coolant supply passage 32*a* is connected to the coolant discharge passage 32*b*.

A second seal member 56 is formed integrally on the surfaces 20*a*, 20*b* of the second metal separator 20 to cover (sandwich) the outer edge of the second metal separator 20. Specifically, the second seal member 56 includes an outer seal 58*a* provided on the surface 20*a*, and near the outer edge of the second metal separator 20, and an inner seal 58*b* spaced inwardly from the outer seal 58*a* by a predetermined distance. The outer seal 58*a* and the inner seal 58*b* are provided on one surface of the second seal member 56 facing the anode 38.

The outer seal 58*a* and the inner seal 58*b* may have various shapes, including tapered shape (lip shape), trapezoid shape, or half-cylinder shape. The outer seal 58*a* is in contact with the first planar section 52 formed on the first metal separator 18, and the inner seal 58*b* is directly in contact with the solid polymer electrolyte membrane 36 of the membrane electrode assembly 16.

When a load is applied to the outer seal 58*a* and the inner seal 58*b* in the stacking direction, the outer seal 58*a* and the inner seal 58*b* are deformed substantially equally in the stacking direction to the same extent. Specifically, the outer seal 58*a* and the inner seal 58*b* have substantially the same shape, and the line pressure of the outer seal 58*a* and the line pressure of the inner seal 58*b* are substantially the same, i.e., the pressure load applied to the outer seal 58*a* per unit length, and the pressure load applied to the inner seal 58*b* per unit length are substantially the same.

As shown in FIG. 6, the outer seal 58*a* is formed around the oxygen-containing gas supply passage 30*a*, the coolant discharge passage 32*b*, the fuel gas discharge passage 34*b*, the fuel gas supply passage 34*a*, the coolant supply passage 32*a*, and the oxygen-containing gas discharge passage 30*b*. The inner seal 58*b* is formed around the fuel gas flow field 44. The outer edge of the membrane electrode assembly 16 is positioned between the inner seal 58*b* and the outer seal 58*a*.

Figure 7:
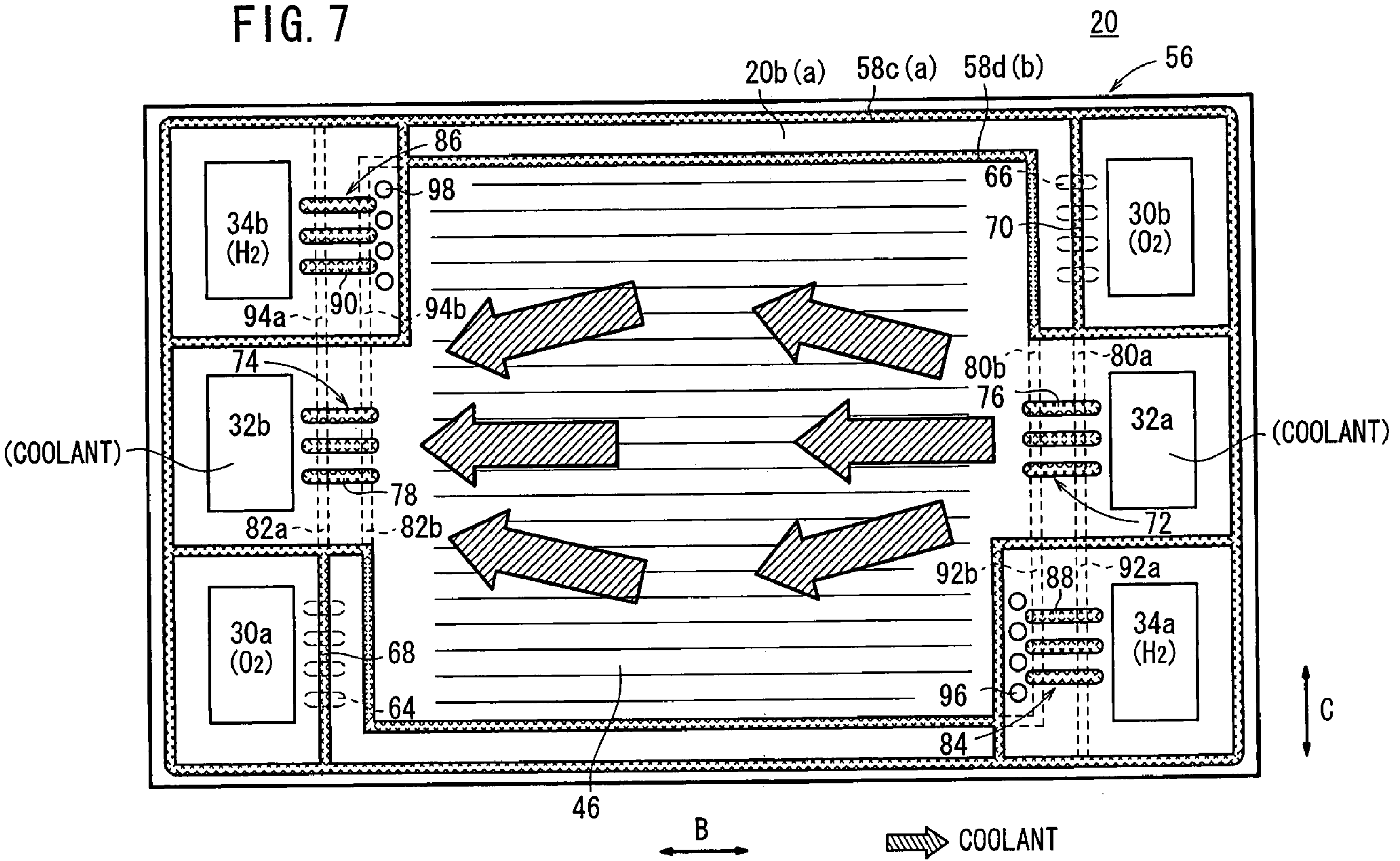
FIG. 7 is a front view showing the other surface of the second metal separator of the power generation cell.

An outer seal (coolant seal) 58*c* corresponding to the outer seal 58*a* and an inner seal 58*d* corresponding to the inner seal 58*b* are provided on the surface 20*b* of the second separator 20 (see FIG. 7). The shapes of the outer seal 58*c* and the inner seal 58*d* are similar to the shapes of the outer seal 58*a* and the inner seal 58*b*. When a load is applied to the outer seal 58*a*, the inner seal 58*d*, and the outer seal 58*c* in the stacking direction, the line pressures of the outer seal 58*a*, the inner seal 58*d*, and the outer seal 58*c* are substantially the same in the stacking direction.

As shown in FIG. 6, the outer seal 58*a* has an inlet channel 60 connecting the oxygen-containing gas supply passage 30*a* and the oxygen-containing gas flow field 42. Further, the outer seal 58*a* has an outlet channel 62 connecting the oxygen-containing gas discharge passage 30*b* and the oxygen-containing gas flow field 42.

The inlet channel 60 is formed by a plurality of flow guides 64 arranged separately in the direction indicated by the arrow C. The flow guides 64 are oriented in the direction indicated by the arrow B. The flow guides 64 are in contact with the first planar section 52 to form passages for the oxygen-containing gas between the flow guides 64. Likewise, the outlet channel 62 of the outer seal 58*a* is formed by a plurality of flow guides 66 oriented in the direction indicated by the arrow B. The flow guides 66 are in contact with the first planar section 52 to form passages for the oxygen-containing gas between the flow guides 66.

The flow guides 64 at the inlet channel 60 formed on the surface 20*a* of the second metal separator 20 overlap a section 68 of the outer seal 58*c* formed on the surface 20*b* of the second metal separator 20. Stated otherwise, the overlapping section 68 is part of the outer seal 58*c* which overlaps the flow guides 64 of the outer seal 58*a* such that the second metal separator 20 is sandwiched between the overlapping section 68 and the flow guides 64. The flow guides 64 are oriented perpendicularly to the overlapping section 68. Thus, the length of the flow guides 64 is larger than the seal width of the outer seal 58*c*. When a load is applied to the flow guides 64 and the overlapping section 68 in the stacking direction, the flow guides 64 and the seal overlapping sections 68 are deformed substantially equally in the stacking direction to the same extent.

The outlet channel 62 and the inlet channel 60 have substantially the same structure. The flow guides 64 on the surface 20*a* of the second metal separator 20 overlap a seal section 70 of the outer seal 58*c* formed on the surface 20*b* of the second metal separator 20. When a load is applied to the flow guides 64 and the seal overlapping section 70 in the stacking direction, the flow guides 64 and the overlapping section 70 are substantially equally deformed in the stacking direction to the same extent (see FIG. 6).

As shown in FIG. 7, an inlet channel 72 connecting the coolant supply passage 32*a* and the coolant flow field 46, and an outlet channel 74 connecting the coolant discharge passage 32*b* and the coolant flow field 46 are formed on the surface 20*b* of the second metal separator 20. The inlet channel 72 is formed by a plurality of flow guides 76 arranged separately in the direction indicated by the arrow C as part of the outer seal 58*c* and the inner seal 58*d*. The flow guides 76 are oriented in the direction indicated by the arrow B. Likewise, the outlet channel 74 is formed by a plurality of flow guides 78 arranged separately in the direction indicated by the arrow C as part of the outer seal 58*c* and the inner seal 58*d*. The flow guides 78 are oriented in the direction indicated by the arrow B.

The flow guides 76 of the inlet channel 72 on the surface 20*b* of the second metal separator 20 overlap a section 80*a* of the outer seal 58*a* and a section 80*b* of the inner seal 58*b* on the surface 20*a* such that the second metal separator 20 is sandwiched between the flow guides 76 and the overlapping sections 80*a*, 80*b*. When a load is applied to the flow guides 76 of the inlet channel 72 and the overlapping sections 80*a*, 80*b* in the stacking direction, the flow guides 76 and the overlapping sections 80*a*, 80*b* are deformed substantially equally in the stacking direction to the same extent.

Likewise, as shown in FIG. 7, the flow guides 78 on the surface 20*a* of the second metal separator 20 overlap a section 82*a* of the outer seal 58*a* and a section 82*b* of the inner seal 58*b* such that the second metal separator 20 is sandwiched between the flow guides 78 and the overlapping sections 82*a*, 82*b*. When a load is applied to the flow guides 78 and the overlapping sections 82*a*, 82*b* in the stacking direction, the flow guides 78 and the overlapping sections 82*a*, 82*b* are deformed substantially equally in the stacking direction to the same extent.

An inlet channel 84 is provided near the fuel gas supply passage 34*a*, and an outlet channel 86 is provided near the fuel gas discharge passage 34*b*. The inlet channel 84 is formed by a plurality of flow guides 88 arranged in the direction indicated by the arrow C. The outlet channel 86 is formed by a plurality of flow guides 90 arranged in the direction indicated by the arrow C.

The flow guides 88 overlap a section 92*a* of the outer seal 58*a* and a section 92*b* of the inner seal 58*b* such that the second metal separator 20 is sandwiched between the flow guides 88 and the overlapping sections 92*a*, 92*b*. Likewise, the flow guides 90 overlap a section 94*a* of the outer seal 58*a* and a section 94*b* of the inner seal 58*b* such that the second metal separator 20 is sandwiched between the flow guides 90 and the overlapping sections 94*a*, 94*b*.

The inlet channel 84 and the outlet channel 86 have the same structure as the inlet channel 72. When a load is applied to the flow guides 88 and the overlapping sections 92*a*, 92*b*, and the flow guides 90 and the overlapping sections 94*a*, 94*b* in the stacking direction, the flow guides 88 and the overlapping sections 92*a*, 92*b*, and the flow guides 90 and the overlapping sections 94*a*, 94*b* are deformed substantially equally in the stacking direction to the same extent. A plurality of supply holes 96 and discharge holes 98 are provided outside the inner seal 58*d*, near the inlet channel 84 and the outlet channel 86, respectively. The supply holes 96 extend through the second separator 20, and are connected to the inlet of the fuel gas flow field 44. The discharge holes 98 extend through the second separator 20, and are connected to the outlet of the fuel gas flow field 44. The inlet and outlet of the fuel gas flow field 44 are positioned inside the inner seal 58*b* on the surface 20*a* of the second metal separator 20 (see FIG. 6).

Operation of the fuel cell 10 will be described below.

As shown in FIG. 1, an oxygen-containing gas is supplied to the oxygen-containing gas supply passage 30*a*, and a fuel gas such as a hydrogen-containing gas is supplied to the fuel gas supply passage 34*a*. Further, a coolant such as pure water, an ethylene glycol or an oil is supplied to the coolant supply passage 32*a*.

The oxygen-containing gas flows from the oxygen-containing gas supply passage 30*a* into the oxygen-containing gas flow field 42 of the first metal separator 18 (see FIG. 5). Then, the oxygen-containing gas flows in a serpentine pattern in the direction indicated by the arrow B, and moves upwardly along the cathode 40 of the membrane electrode assembly 16 for inducing an electrochemical reaction at the cathode 40. The fuel gas flows from the fuel gas supply passage 34*a* into the fuel gas flow field 44 of the second metal separator through the supply holes 96 (see FIG. 3). The fuel gas flows in a serpentine pattern in the direction indicated by the arrow B, and moves upwardly along the anode 38 of the membrane electrode assembly 16 for inducing an electrochemical reaction at the anode 38 (see FIG. 6).

Thus, in the membrane electrode assembly 16, the oxygen-containing gas supplied to the cathode 40, and the fuel gas supplied to the anode 38 are consumed in the electrochemical reactions at catalyst layers of the cathode 40 and the anode 38 for generating electricity.

After the oxygen in the oxygen-containing gas is consumed at the cathode 40, the oxygen-containing gas is discharged into the oxygen-containing gas discharge passage 30*b* in the direction indicated by the arrow A. Likewise, after the fuel gas is consumed at the anode 38, the fuel gas is discharged through the discharge holes 98 into the fuel gas discharge passage 34*b* in the direction indicated by the arrow A.

The coolant from the coolant supply passage 32*a* flows into the coolant flow field 46 between the first and second metal separators 18, 20, and flows in the direction indicated by the arrow B for cooling the membrane electrode assembly 16. Then, the coolant is discharged into the coolant discharge passage 32*b* (see FIG. 1).

In the present embodiment, the second seal member 56 is provided integrally on the second metal separator 20, and the second seal member 56 has the outer seal 58*a* and the inner seal 58*b* on its surface facing the anode 38. The outer seal 58*a* and the inner seal 58*b* have substantially the same shape, and the line pressure of the outer seal 58*a* and the line pressure of the inner seal 58*b* are substantially the same. When a load is applied to the outer seal 58*a* and the inner seal 58*b* in the stacking direction, the outer seal 58*a* and the inner seal 58*b* are deformed substantially equally in the stacking direction to the same extent.

Thus, the outer seal 58*a* and the inner seal 58*b* are deformed substantially equally on the surface 20*a* of the second metal separator 20, and the line pressure (load) applied to the second metal separator 20 is well-balanced, and thus, the second metal separator 20 is not deformed undesirably. It is possible to effectively prevent deformation of the membrane electrode assembly 16.

Figure 8:
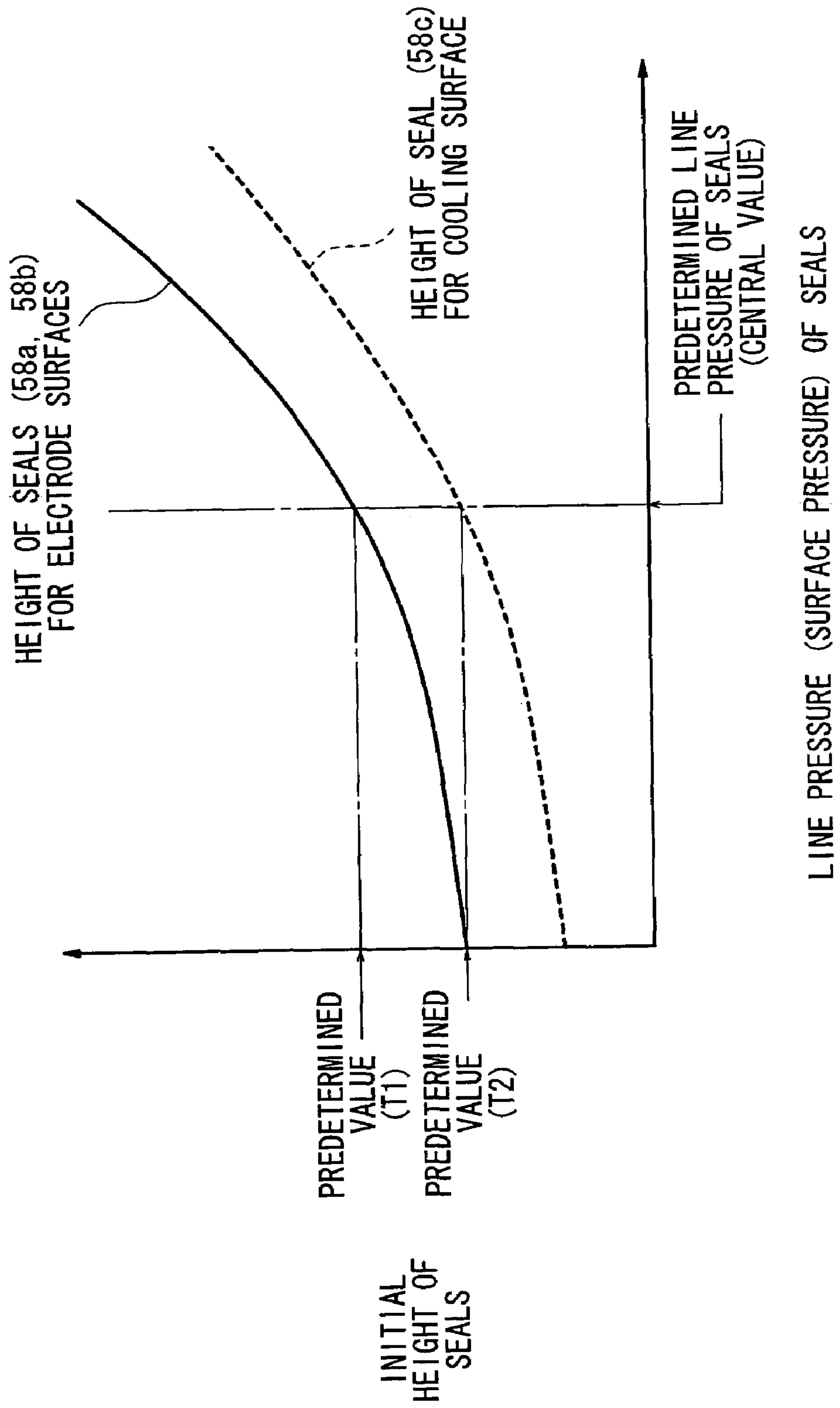
FIG. 8 is a view showing relationship between the line pressure of the seal and the initial height of the seal.
Figure 9:
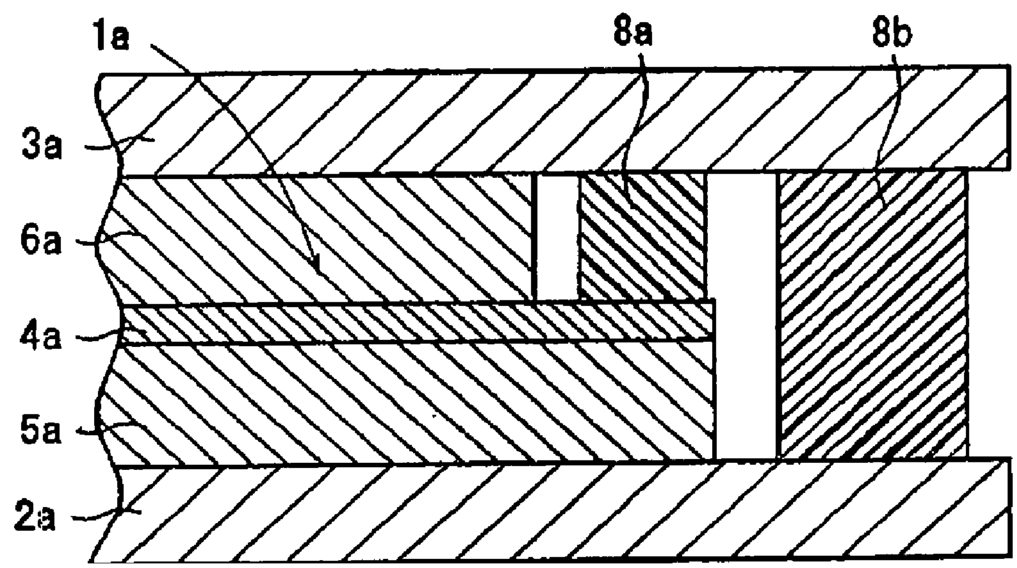
FIG. 9 is a view showing sealing structure disclosed in Japanese laid-open patent publication No. 2002-25587.

Further, in the present embodiment, when a load is applied to the outer seal 58*a*, the inner seal 58*b*, and the outer seal 58*c* in the stacking direction, the line pressures of the outer seal 58*a*, the inner seal 58*b*, and the outer seal 58*c* are substantially the same in the stacking direction. Specifically, referring to FIG. 8, an initial seal height T1 which achieves the desired line pressure of the seals for the electrode surfaces (the outer seal 58*a* and the inner seal 58*b*) when the power generation cells 12 are stacked together is determined, and an initial seal height T2 which achieves the desired line pressure of the seal for the coolant surfaces (the outer seal 58*c*) when the power generation cells 12 are stacked together is determined. The line pressures of the outer seal 58*a*, the inner seal 58*b*, and the outer seal 58*c* are substantially the same. The initial seal height T1 and the initial seal height T2, however, are determined respectively and not necessarily the same.

Consequently, deformation of the power generation cells 12 in the stacking direction is prevented. The load distribution in the surfaces of the power generation cells 12 is uniform. The load is equally applied to each of the power generation cells 12. Thus, the overall power generation performance of the fuel cell 10 is maintained stably. It is possible to maintain the flow rates of the oxygen-containing gas, the fuel gas, and the coolant stably. The uniform power generation performance can be stably maintained in each of the power generation cells 12.

Physical characteristics of the outer seal 58*a*, the inner seal 58*b*, and the outer seal 58*c* change equally over time. Line pressures of the outer seal 58*a*, the inner seal 58*b*, and the outer seal 58*c* are equally decreased, and the outer seal 58*a*, the inner seal 58*b*, and the outer seal 58*c* have substantially the same compression set, or the like. Thus, the components of the power generation cell 12 have the same durability, and the power generation cells 12 have the same durability. The power generation performance can be maintained stably in the entire fuel cell 10.

In the embodiment of the present invention, the outer seal 58*c* is provided as the coolant seal on the surface 20*b* of the second metal separator 20. The structure is not essential to the present invention. The coolant seal may be provided on the surface 18*b* of the first metal separator 18.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking power generation cells each including a membrane electrode assembly and first and second separators sandwiching said membrane electrode assembly, said membrane electrode assembly including a first electrode, a second electrode, and an electrolyte membrane interposed between said first electrode and said second electrode, wherein a surface area of said second electrode is larger than a surface area of said first electrode, and reactant gas flow fields are formed between said membrane electrode assembly and said first and second separators for supplying reactant gases along electrode surfaces of said first and second electrodes, said fuel cell comprising:

a first seal member provided on said first separator and a second seal member provided on said second separator, wherein said second seal member includes an inner seal portion and an outer seal portion provided on one surface of said second seal member facing said electrode;

wherein said inner seal portion is interposed between said electrolyte membrane and said second separator, and wherein said outer seal portion is interposed between said first and second separators and contacts said first seal member, wherein, when a load is applied to said inner seal portion and said outer seal portion in a stacking direction of said power generation cells, said inner seal portion and said outer seal portion are deformed substantially equally in said stacking direction to the same extent.

2. A fuel cell according to claim 1, wherein said inner seal portion and said outer seal portion have substantially the same shape, and line pressures of said inner seal portion and said outer seal portion are substantially the same.

3. A fuel cell according to claim 1, wherein a coolant flow field is formed between said power generation cells for supplying a coolant to cool said power generation cells;

a coolant seal for sealing said coolant flow field is provided corresponding to said outer seal portion on another surface of said second seal member; and when a load is applied to said inner seal portion, said outer seal portion, and said coolant seal in said stacking direction, line pressures of said inner seal portion, said outer seal portion, and said coolant seal are substantially the same in said stacking direction.

4. A fuel cell according to claim 1, wherein a coolant flow field is formed between said power generation cells for supplying a coolant to cool said power generation cells;

a coolant seal for sealing said coolant flow field is provided corresponding to said outer seal portion on a surface of said first seal member which is opposite to a surface of said first seal member facing said second electrode; and when a load is applied to said inner seal portion, said outer seal portion, and said coolant seal in said stacking direction, line pressures of said inner seal portion, said outer seal portion, and said coolant seal are substantially the same in said stacking direction.

* * * * *